(12) United States Patent
Haugarth (10) Patent No.: US 9,514,471 B2
(45) Date of Patent: Dec. 6, 2016

(54) SYSTEM AND METHOD FOR TRACKING PRODUCT INTERACTION

(71) Applicant: Ryan Alan Haugarth, Kowloon (HK)

(72) Inventor: Ryan Alan Haugarth, Kowloon (HK)

( * ) Notice: Subject to any disclaimer, the term of this patent is extended or adjusted under 35 U.S.C. 154(b) by 0 days.

(21) Appl. No.: 14/828,057

(22) Filed: Aug. 17, 2015

(65) Prior Publication Data

US 2016/0055360 A1 Feb. 25, 2016

Related U.S. Application Data

(60) Provisional application No. 62/038,817, filed on Aug. 18, 2014.

(51) Int. Cl.
*G06Q 30/02* (2012.01)
*G06K 17/00* (2006.01)

(52) U.S. Cl.
CPC ... *G06Q 30/0201* (2013.01); *G06K 2017/0045* (2013.01)

(58) Field of Classification Search
CPC ............ G06K 7/10366; G06K 7/10009; G06K 19/0723; G06K 7/10316; G06K 7/10356; G06K 19/0717; G06K 7/10128
USPC ......................................................... 340/10.1
See application file for complete search history.

(56) References Cited

U.S. PATENT DOCUMENTS

| | | | |
|---|---|---|---|
| 7,240,834 B2 | 7/2007 | Kato | |
| 7,853,477 B2 | 12/2010 | O'Shea | |
| 8,325,019 B2 | 12/2012 | Liu | |
| 8,700,451 B2 | 4/2014 | Jayakody | |
| 8,825,085 B1 | 9/2014 | Boyle | |
| 2008/0021766 A1 | 1/2008 | McElwaine | |
| 2010/0277321 A1 | 11/2010 | McElwaine | |
| 2011/0084807 A1* | 4/2011 | Logan | H04Q 9/00 340/10.1 |
| 2013/0074121 A1 | 3/2013 | Berry | |
| 2013/0176115 A1* | 7/2013 | Puleston | H04L 67/04 340/10.51 |
| 2013/0293355 A1* | 11/2013 | Christopher | G06K 7/10376 340/10.1 |
| 2014/0019367 A1 | 1/2014 | Khan | |
| 2014/0214674 A1 | 7/2014 | Narula | |
| 2014/0222531 A1 | 8/2014 | Jacobs | |
| 2014/0306806 A1* | 10/2014 | Martinez de Velasco Cortina | G06Q 30/02 340/10.1 |
| 2015/0035650 A1* | 2/2015 | Lind | H04L 63/126 340/10.1 |
| 2015/0130593 A1* | 5/2015 | Mats | G06K 7/10366 340/10.1 |
| 2015/0154538 A1* | 6/2015 | Skaaksrud | H04W 12/06 705/333 |

\* cited by examiner

*Primary Examiner* — Mark Blouin
(74) *Attorney, Agent, or Firm* — Norman J. Hedges (57) ABSTRACT

The present disclosure relates to a system and method for tracking an individual's interaction with objects in a physical environment by pairing the movement of an RFID tagged object to a mobile device based on time and proximity.

20 Claims, 7 Drawing Sheets

SYSTEM AND METHOD FOR TRACKING PRODUCT INTERACTION

CROSS-REFERENCE TO RELATED APPLICATIONS

This application claims the benefit of U.S. Provisional Application No. 62/038,817, filed Aug. 18, 2014, the entire disclosure of which is expressly incorporated by reference herein.

FIELD OF THE DISCLOSURE

The present disclosure generally relates to a system and method for consumer tracking, and more particularly to a system and method for tracking an individual's interaction with objects in a physical environment by pairing movement of an RFID tagged object to a mobile device based on proximity.

BACKGROUND

Merchants spend time, effort, and money tracking the preferences and behaviors of potential, current, and former customers. The global CRM (Consumer Relationship Management) industry offers a range of approaches to help merchants track and optimize sales, marketing, and after-sales touch points with customers. Tracking which products a potential or current customer is considering and which products a customer ultimately purchases is a critical component of most CRM programs, such as to deploy and track effectiveness of marketing campaigns that seek to move the customer between those two points on the customer journey.

In online environments, automatically tracking an individual customer's interest in a specific product has been accomplished by using web cookies to track product web pages or product images viewed by that customer. This data is often used to re-target a customer with product specific marketing messages or advertisements in an attempt to convert consideration for a product into a purchase.

In offline environments, such as a retail establishment, tracking a customer's purchase history is common for CRM purposes. However, there is currently no efficient method for tracking a customer's offline interaction with specific products before the point of sale. These interactions, such as touching or holding a product inside or near merchandise display areas or trying a product in a product fitting room, hold value as an indicator of customer interest in a particular product. Mobile applications (apps) exist that track items with barcodes that are physically scanned by customers with their smartphones; however, inconsistent or infrequent use of these apps by customers renders them ineffective for CRM purposes. There is a need for a tracking method that requires limited or no action from the customer, other than natural shopping behavior at the retail establishment. Further, there is a need for a tracking method that automatically associates the offline product interactions with specific customers in an online CRM system.

SUMMARY

According to an illustrated embodiment of the present disclosure, a system is provided including a plurality of RFID tags and an RFID reader system. Each RFID tag is configured to attach to an object, such as a retail product for example. The RFID reader system includes at least one RFID reader in communication with at least one RFID antenna and is operative to detect an RFID tag in a tracking zone. The tracking zone is based on a detection range of the RFID reader system. The system includes at least one broadcasting device operative to broadcast a signal in the tracking zone. The signal is configured to be received by a mobile device positioned in the tracking zone. The system further includes a computer processor operative to receive RFID event data relating to the detection of the RFID tag in the tracking zone. The RFID event data is provided by the at least one RFID reader. The processor is further configured to receive mobile device data provided by the mobile device based on the signal broadcast by the at least one broadcasting device in the tracking zone. The processor is further configured to pair the RFID event data with the mobile device data to track a movement in the tracking zone of an object corresponding to the detected RFID tag.

According to another illustrated embodiment of the present disclosure, a method is provided including: generating, by an RFID reader in communication with an RFID antenna, RFID event data relating to a movement of at least one RFID tag in a tracking zone; broadcasting, by at least one broadcasting device, a signal in the tracking zone configured for receipt by a mobile device positioned in the tracking zone; and receiving, by a processor in communication with the RFID reader and the at least one broadcasting device, mobile device data provided by the mobile device in the tracking zone. The mobile device data is based on the signal broadcast by the at least one broadcasting device. The method further includes pairing, by the processor, the RFID event data with the mobile device data to track an interaction with the at least one RFID tag.

According to yet another illustrated embodiment of the present disclosure, a method carried out by at least one processor is provided. The method includes receiving RFID event data relating to a monitored RFID tag in a tracking zone from an RFID reader system. The RFID tag is configured to attach to an object. The method further includes receiving mobile device data provided by a mobile device positioned in the tracking zone. The mobile device data is provided in response to a signal broadcasted in the tracking zone by a broadcasting device. The method further includes pairing the RFID event data with the mobile device data to track an interaction with the object corresponding to the RFID tag and storing the paired data.

Additional embodiments, as well as features and advantages of embodiments of the disclosure, will be apparent from the descriptions herein.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION

The embodiments disclosed herein are not intended to be exhaustive or limit the disclosure to the precise forms disclosed in the following detailed description. Rather, the embodiments are chosen and described so that others skilled in the art may utilize their teachings.

The present disclosure provides a system and method for tracking an individual's interaction with objects in a physical environment by pairing movement of a tagged object to a mobile device based on proximity. In some embodiments, communication between the tagged object, the mobile device, and a data processor of the system is accomplished by utilizing at least one of a set of data communication protocols. In an illustrative embodiment, radio frequency identification (RFID) is used by the system to identify the presence and/or movement of objects in a tracking zone. In one embodiment, the mobile device communicates with the data processor using short-range or medium-range wireless communication, such as Bluetooth technology and/or Apple's iBeacon™ technology for example, although other suitable communication technology may be used. In an illustrated embodiment, the mobile device is operative to capture and communicate customer information through a user-downloaded application based on user inputs to the mobile device.

In one embodiment, one or more tracking zones are set up at a physical location, such as a retail store or other merchant environment. Each tracking zone contains one or more RFID antennas connected to an RFID reader (together, an RFID reader system), which detects the presence of RFID tags coupled to objects (e.g., products) inside the tracking zone, and one or more broadcasting devices (e.g., beacons), which transmit signals that are configured to be received by mobile devices inside the tracking zone. In one embodiment, the RFID tags are attached to a retail product, such as an article of clothing, a food product, an electronics product, or other suitable product for sale, for example. In one embodiment, customer mobile devices are configured to capture the beacon signals and wirelessly send associated data to the data processing system, including data that can be used to identify the customer.

In an illustrated embodiment, the data processor receives and stores data from RFID reader system(s) related to each RFID tag moved into and/or within a tracking zone and from mobile devices related to each beacon signal received in a tracking zone. In this embodiment, the data processor pairs data from these sources to link the RFID event data to the mobile device, and ultimately to a specific individual based on customer or device identification data provided by the mobile device and a customer database. In one exemplary embodiment, this is accomplished by using a processor to encode detected RFID tag details directly into beacon signals transmitted by the broadcasting device. The mobile device then transfers this RFID data and beacon signal data back to the data processing system, which is operative to extract and pair the RFID tag movement event and customer identification details.

In an alternate embodiment, the beacon signal includes only location data (e.g., identifying the tracking zone) which is captured by a mobile device. The mobile device sends the received location data as well as customer and/or device identification data to the data processor, and the data processor pairs the location data to RFID event data detected in the same tracking zone or area at the same time.

In another embodiment, the mobile device broadcasts its identity to the beacon system, which sends this data to a data processor, allowing the processor to match a mobile device, and thus a connected individual, to RFID tags detected in the same area at the same time.

Figure 1:
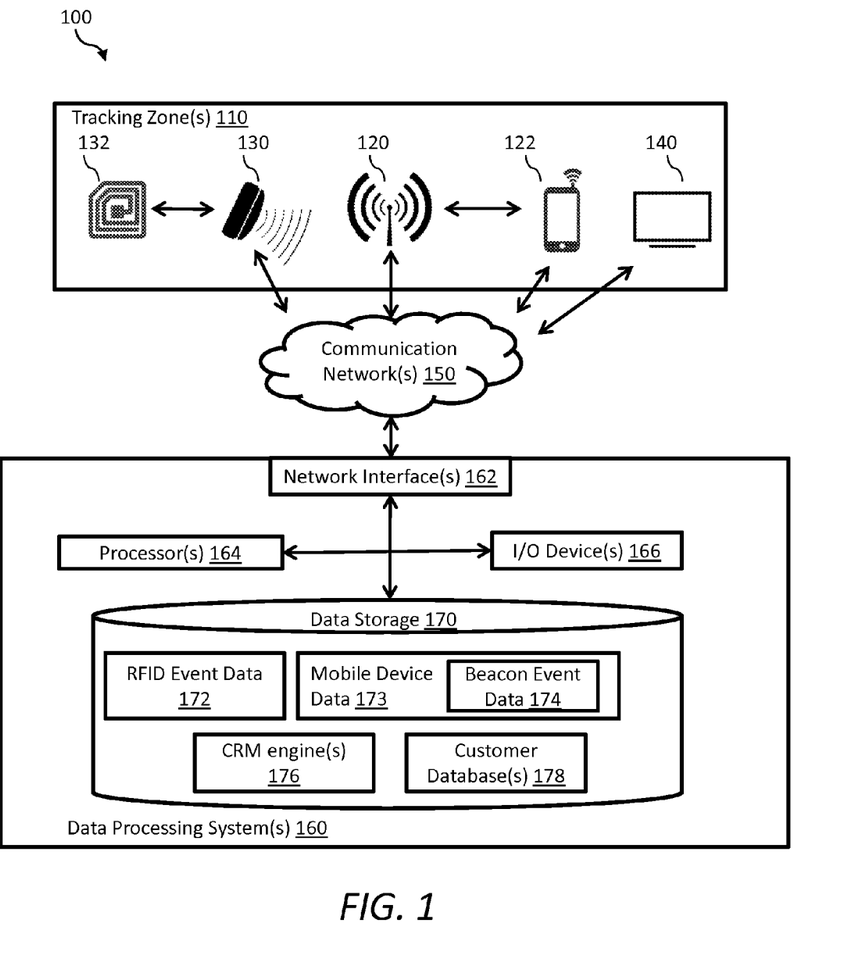
FIG. 1 is a representative view of a tracking system operative to pair movement of a tagged object to a mobile device based on proximity according to an illustrative embodiment of the present disclosure.

Referring to FIG. 1, there is illustrated a block diagram of an exemplary tracking system or environment 100 in accordance with an embodiment which is set up and maintained for or by an organization, such as a retailer, for tracking and recording the movement of items or objects, such as retail products, in a physical location and associating those records with an individual, such as a customer. As illustrated, tracking system 100 includes one or more physical tracking zones 110. Within each tracking zone 110 are one or more RFID antennas connected to at least one RFID reader (together, an RFID reader system 130), which is operative to detect and read RFID tags 132 moving inside of the corresponding tracking zone 110. Each tracking zone 110 also includes one or more broadcasting devices, illustratively beacons 120, which are communication devices capable of transmitting signals to and/or receiving signals from mobile devices 122, such as smart phones for example, inside of the corresponding tracking zone 110, when those mobile devices 122 have been properly configured. Beacons 120 are also in communication with data processing system 160 via network 150, and in some embodiments are controlled and generate beacon signals based on commands and data from system 160. Tracking zones 110 may also contain one or more digital displays 140, such as an LCD screen, capable of displaying marketing messages.

Beacons 120 are operative to transmit a beacon signal, which may include radio, ultrasonic, optical, laser, Bluetooth, or other types of signals, into the tracking zone 110. In one embodiment, the beacon signals are repeatedly transmitted, such as every few seconds or other suitable period. The beacon signals are configured to carry several modifiable parameters, such as relative address, location, timestamp, RFID tag details, signal strength, available bandwidth resources, and any other suitable parameters. Mobile devices 122 are programmable to detect and receive these beacon signals and to transmit signals back to beacons 120 and/or data processing system 160.

Each tracking zone 110 spans a physical area or region that is monitored by the tracking system 100. In an illustrated embodiment, the tracking zone 110 is formed based on the configuration and range of the RFID antennas and/or beacon devices 120. In particular, each RFID reader system 130 has a detection range dictated by the arrangement its power capabilities. The RFID antennas are arranged to detect RFID tags 132 within a certain region to form the tracking zone. Further, beacon devices 120 are arranged to transmit within the tracking zone 110 formed by the RFID reader system 130 configuration. In one embodiment, each beacon device 120 is configured to broadcast and receive signals only within its corresponding tracking zone 110, although the beacon devices 120 may alternatively have range extending outside the associated tracking zones 110.

Figure 5:
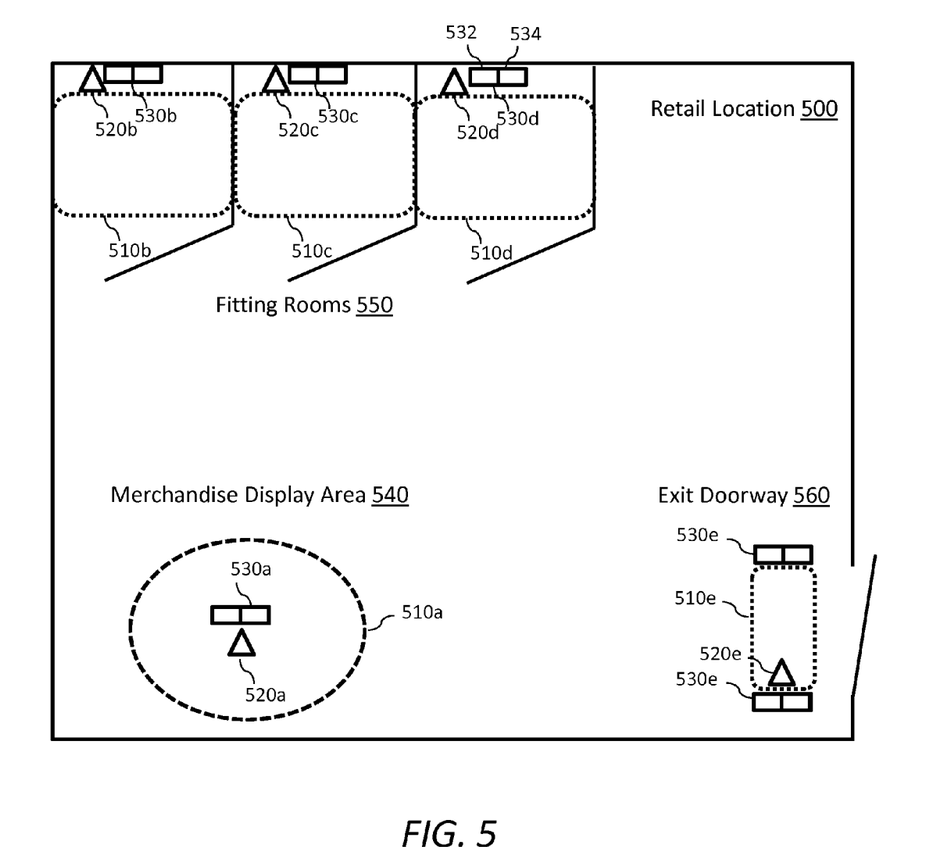
FIG. 5 illustrates an exemplary retail environment including a plurality of tracking zones.

As illustrated in FIG. 5, a retail organization may, in one retail location 500, choose to set up multiple tracking zones 510a, 510b, 510c, 510d, and 510e by positioning respective RFID reader systems 530a, 530b, 530c, 530d, and 530e and beacons 520a, 520b, 520c, 520d, and 520e in designated discrete areas, such as to track products moved by a customer in a merchandise display area 540, brought by a customer into fitting rooms 550 for trying on clothing, or taken by a customer through a payment point or out an exit doorway 560 of the retail location 500, for example. In one embodiment, each tracking zone 510a-e is set up to provide additional insight for CRM purposes. As illustrated, each RFID reader system 530a-e includes an RFID reader 532 and one or more RFID antennas 534 coupled to the RFID reader 532 (e.g., see RFID reader system 530d). Each RFID reader 532 includes at least one processing device operative to detect and identify RFID tags via the associated RFID antenna 534. In one embodiment, each RFID reader system 530a-e includes communication capability for communicating with a data processing system (e.g., system 160 of FIG. 1) and the associated beacon devices 520. In one embodiment, the data processing system is located within retail location 500 but may alternatively be remote from retail location 500.

Referring back to FIG. 1, the exemplary tracking system 100 also includes one or more data processing systems 160, which use one or more communication networks 150, such as wired or wireless local area or wide area network(s) and/or cellular telephony network(s), to communicate with RFID reader systems 130, beacons 120, mobile devices 122, and digital displays 140. As described in greater detail herein, communication with these devices allows data processing systems 160 to match movement of RFID tags 132 in a tracking zone 110 to a specific individual whose mobile device 122 was detected in the same tracking zone 110 in the same period of time.

Data processing systems 160 include one or more network interfaces 162 that permit communication via communication networks 150. Data processing systems 160 also include one or more processors 164 that execute program code, for example, operative to pair or match RFID tags 132 to mobile devices 122 and individuals based on time, proximity and other data received from one or more sources. Data processing systems 160 also include input/output (I/O) devices 166, such as ports, displays, and attached devices, etc., which receive inputs and provide outputs of the processing performed by data processing systems 160. Finally, data processing systems 160 include data storage 170, which may include one or more storage devices, including memories, optical or magnetic disk drives, tape drives, and other suitable storage media.

Data storage 170 stores data, including program code, which can be processed and/or executed by processor 164, for example, to track an individual's contact with physical items, incorporate resulting data into a customer relationship management (CRM) program, and implement targeted marketing or advertising campaigns. In the depicted embodiment, data storage 170 includes RFID event data 172 that is collected from RFID reader systems 130. RFID event data 172 consists of stored records for each instance that each RFID tag 132 was read by an RFID reader system 130, with full tag information along with identification of the tracking zone 110, identification of the reader system 130, time stamp and signal strength associated with the reading, and other detected parameters. In the illustrated embodiment, data storage 170 also includes mobile device data 173 collected from mobile devices 122 and/or beacons 120. Mobile device data 173 includes mobile device location data, customer identity data, mobile account ID, signal strength data, time stamp information, and in some embodiments, beacon event data 174. In the illustrated embodiment, beacon event data 174 consists of records for each contact made between a beacon 120 and a properly configured mobile device 122, with details of customer and/or device identity stored, such as mobile account ID, along with time stamp, signal strength and location data, such as GPS coordinates, beacon MAC address and tracking zone 110 ID, associated with the contact. In some embodiments, described in more detail herein, beacon event data 174 may also include data related to RFID tags 132 that was transmitted with the beacon signal.

Data storage 170 illustratively further includes customer databases 178, which includes information regarding potential, current and/or former customers of the organization. Information stored in customer databases 178 includes all available information related to individual customers, including a unique client ID, online account ID, mobile account ID, name, gender, age, mobile device type, mobile phone number, email address, social media accounts, purchase history, marketing segment info, etc. Data storage 170 also includes CRM engines 176 which include program code executable by processor(s) 164 to provide an interface for an organization, or their $3^{rd}$ party partners, to view, manipulate, correlate and take action on data and devices connected in the data processing environment 100. In one embodiment, executed CRM engines 176 enable an organization, or their $3^{rd}$ party partners, to view and edit a conversion table that translates RFID event data 172 into a format that can be transmitted by beacons 120 to mobile devices 122. CRM engines 176 also enable an organization, or their $3^{rd}$ party partners, to setup, deploy and measure the results of targeted marketing and/or advertising campaigns, including campaigns displayed on customer mobile devices 122, such as push notifications, or campaigns displayed on digital displays 140 in tracking zones 110.

Figure 2:
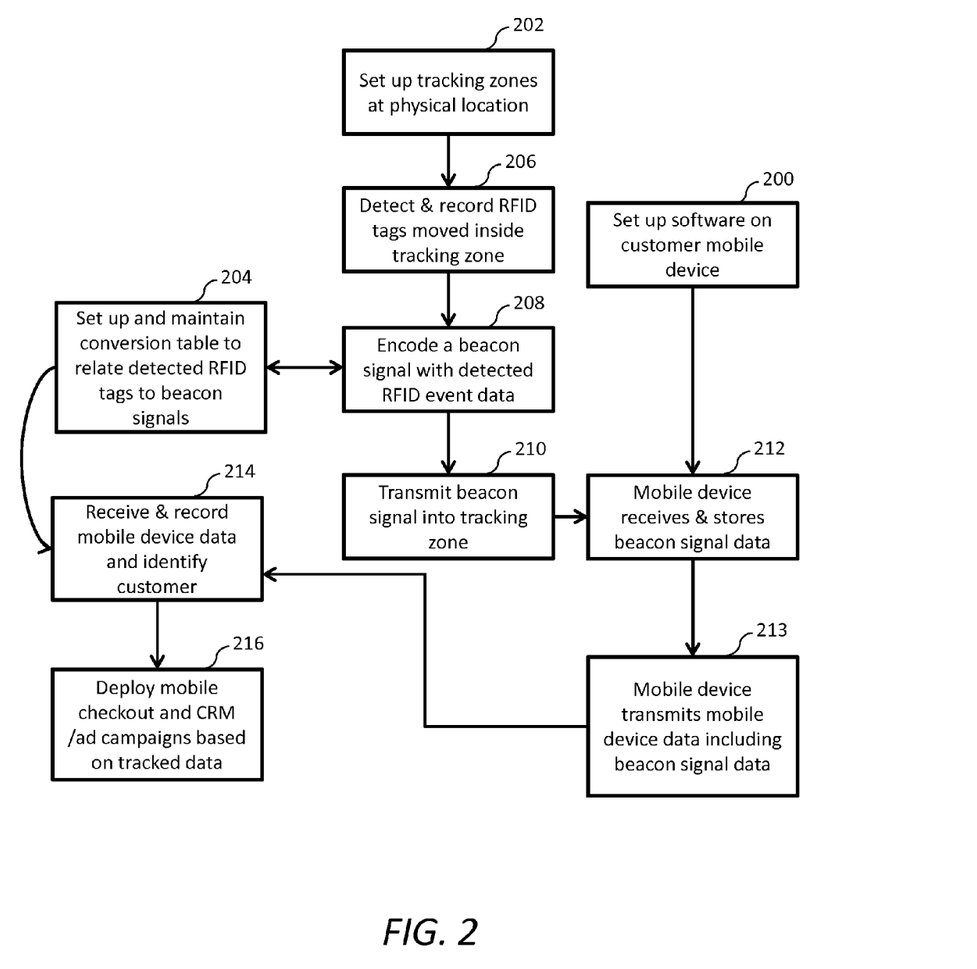
FIG. 2 is a flow diagram of an exemplary method of tracking consumer and product interaction wherein the beacon signal contains RFID tag information.
Figure 3:
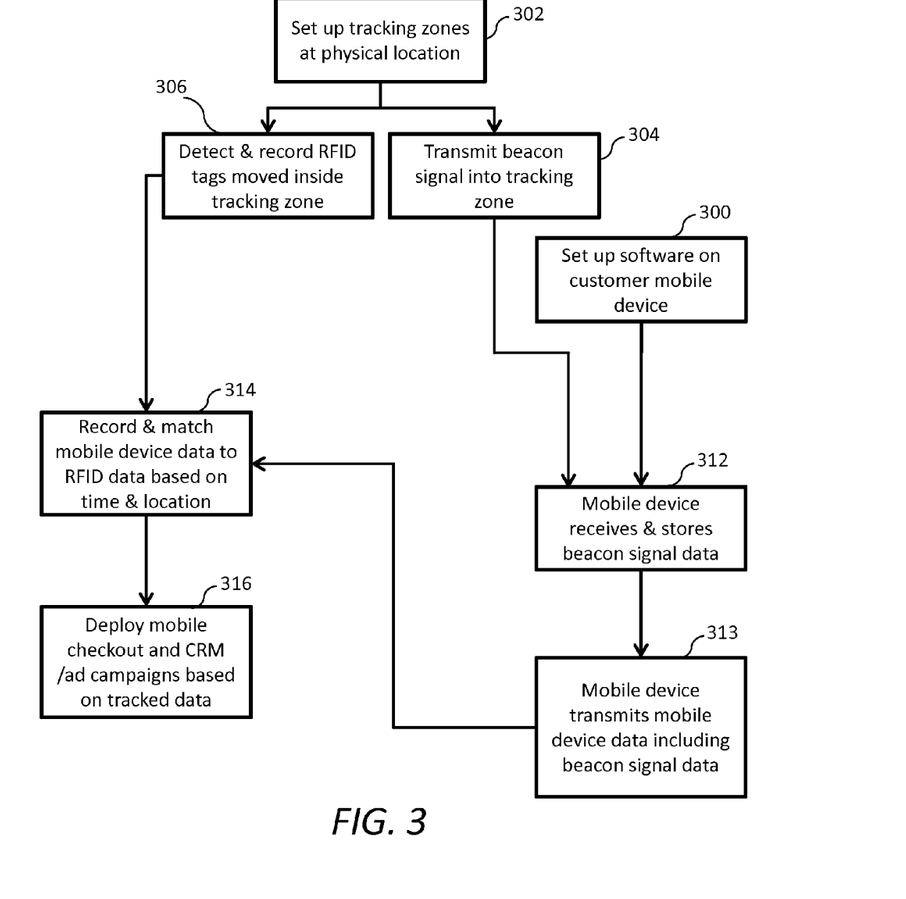
FIG. 3 is a flow diagram of an exemplary method of tracking consumer and product interaction wherein the beacon signal contains location information without RFID tag information.
Figure 4:
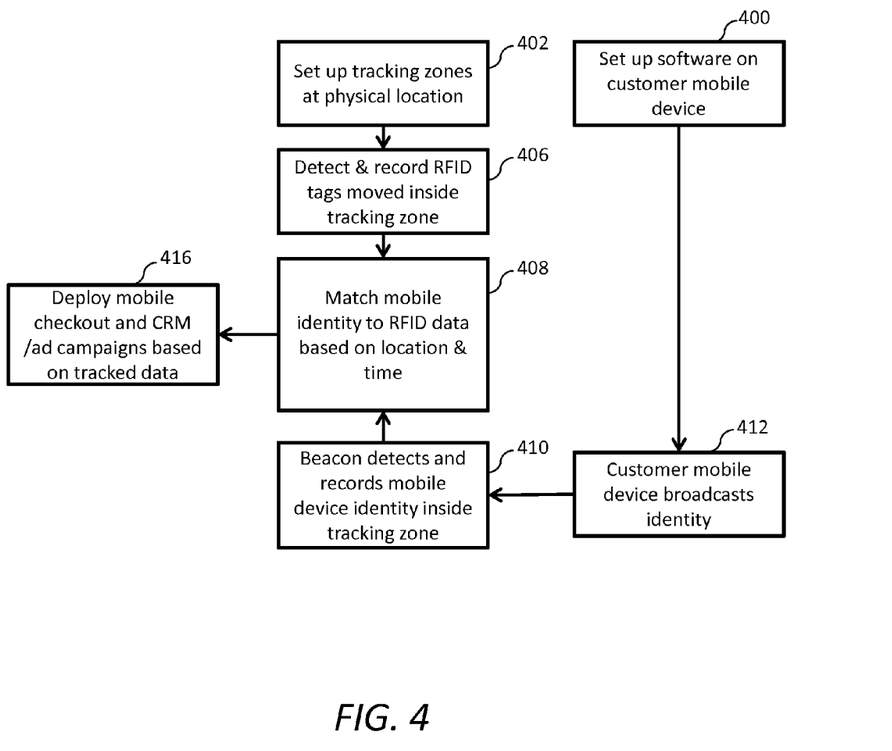
FIG. 4 is a flow diagram of an exemplary method of tracking consumer and product interaction wherein the beacon receives identity information from the mobile device.

Referring now to FIG. 2, there is depicted a high level logical flowchart of an exemplary process for tracking an individual's interaction with RFID tagged items for use in accordance with an illustrative embodiment. In this embodiment, the beacon signal detected by the mobile device 122 includes location information as well as identifying information associated with RFID tags detected in the same area at the same time. As a logical flowchart, it should be understood that FIG. 2, in addition to FIG. 3 and FIG. 4, present various steps in a process in logical rather than chronological order. Accordingly, in various implementations, one or more of the steps in each illustration can be performed in an alternative order or contemporaneously. Reference is made to FIG. 1 throughout the description of FIGS. 2-4.

Block 202 on FIG. 2 represents the physical setup of tracking zones 110 by individuals of an organization, or by their third party partners, which requires the positioning of RFID reader systems 130 and beacons 120 at a physical location to form the tracking zones 110. Each RFID reader system 130 and beacon 120 is registered to a tracking zone 110 in data storage 170 of system 160, for example by linking the device MAC address to a location, so that data originating from these devices may be related to a tracking zone 110 by processor 164. Each RFID reader system 130 is in communication with data processing system 160. In the preferred embodiment, beacons 120 are communicatively connected to and controlled by data processing system 160 and transmit signals which are configured to be passively received by mobile devices 122 inside the same tracking zone 110. In one embodiment, the transmitted signals conform to Apple's iBeacon™ communication protocol and use Bluetooth low energy (BLE) communication technology.

Block 206 depicts an RFID reader system 130 reading one or more RFID tags 132 that move into or within a tracking zone 110. For each read RFID tag 132, RFID reader system 130 then transmits RFID event data 172 to data processing system 160 for storage in data storage 170, and the RFID event data 172 indicates the time, location, identification, and other details of the tag read event, as described herein. Block 204 depicts an organization, or their $3^{rd}$ party partners, maintaining a conversion table located in data storage 170 and executable by processor 164 that translates RFID event data 172 into a format that can be transmitted by beacons 120 to properly configured mobile devices 122. In this embodiment, the conversion table translates identifying information from an RFID tag 132, or an RFID event data 172 record, into a unique combination of values that can be transmitted by beacons 120. In one exemplary embodiment, the translated combination of values uses major and minor values of iBeacon™ or other suitable beacon protocol.

At block 208, data processing system 160, in near real time, translates each new RFID event data 172 record into a formatted beacon signal using the aforementioned conversion table. In one embodiment, the resulting signal follows the iBeacon™ protocol, containing a static universally unique identifier (UUID) value, which allows properly configured mobile devices 122 to recognize the signal, and containing dynamic major and minor values that link back to RFID tag details based on the conversion table. Other suitable beacon protocols may be used. Block 210 depicts the data processing system 160 instructing the beacon 120 to transmit the resulting signal into the tracking zone 110.

Block 200 depicts the installation, setup, and configuration of software on a current or prospective customer's mobile device 122. In one embodiment, the software allows the mobile device 122 to passively listen for, recognize, and store the payload of signals transmitted from beacons 120. Passive in this context means no active involvement is required from the customer after the software has been installed and enabled/activated. The software also allows the mobile device 122 to automatically send data through communication networks 150 to data processing systems 160, including data that can be used to identify the customer. In the preferred embodiment, the customer sets up and configures the software on their mobile device 122 by installing a mobile application (app), which registers corresponding unique mobile account IDs on the mobile device 122 and in the customer database 178. When possible, CRM engines 176 executed by processor(s) 164 use all available information to enable pairing of a mobile account ID to existing customer records in customer databases 178. In one embodiment, the executed app is programmed to passively listen for and recognize one or more specified beacon (e.g., iBeacon™ or other beacon protocol) UUID values carried in the payload of signals transmitted by beacons 120. In one embodiment, whenever its operating system allows, the mobile device 122 will passively listen for and recognize UUID values when the app is not running, and will automatically trigger actions required in order for the app to store the associated signal data.

Block 212 depicts the customer's mobile device 122, when located in the corresponding tracking zone 110, receiving and storing data associated with recognized beacon 120 signals. Data stored includes all information available in the beacon signal payload, such as the transmitting beacon's 120 MAC address and the beacon (e.g., iBeacon™ or other beacon protocol) UUID value, major value, minor value and transmit (TX) power value. The mobile device 122 can also record internal data related to when the signal was received, such as GPS coordinates and time stamp. Block 213 depicts the mobile device 122 transmitting a signal including the beacon signal data and mobile device data to the processing system 160.

Block 214 depicts the data processing system 160 receiving the transfer of the aggregate data from the mobile device 122, where along with the customer's corresponding mobile account ID, the information is stored as beacon event data 174. In one embodiment, CRM engine 176 executed by processor 164 uses the aforementioned conversion table to extract RFID tag 132 information from the beacon (e.g., iBeacon™ or other beacon protocol) major and minor values and extract location information related to the beacon location, for example by using the beacon's MAC address that was previously registered to a tracking zone 110. As a result, when paired with the corresponding registered mobile account ID in the customer database 178, beacon event data 174 links specific customers to RFID tags 132, and thus interaction with specific products, in a specific tracking zone 110 at a specific point in time. To increase data accuracy, executed CRM engines 176 may compare signal strengths in RFID event data 172, representing distance between RFID reader system 130 and RFID tag 132, against signal strengths in related beacon event data 174, representing distance between beacon 120 and mobile device 122, to filter out matches that may have been false positives.

Block 216 depicts setup, deployment, and tracking of mobile checkout & targeted CRM and/or advertising campaigns by an organization, or their $3^{rd}$ party partners, using data processing systems 160 and all data available to those systems. Mobile customer checkout could be based on RFID tagged items detected in a tracking zone 510e setup at a merchant's exit doorway (FIG. 5), allowing a customer to pay for detected items using their mobile device 122, or allowing the merchant to automatically charge the customer's account for those items based on data available in customer databases 178. Through network interfaces 162 and communication networks 150, targeted marketing and/or advertising campaigns could use a variety of channels for delivering highly targeted marketing messages, including reaching customers on their mobile devices 122 and/or on digital displays 140 located in targeting zones 110. Content displayed in those campaigns and could be related to specific products in which the customer has demonstrated an interest and/or has purchased.

Referring now to FIG. 3, there is depicted a high level logical flowchart of an exemplary process for tracking an individual's interaction with RFID tagged items for use in accordance with an alternative embodiment. In this embodiment, beacons 120 transmit signals that contain beacon ID and location information corresponding to the tracking zone 110 but do not contain RFID tag identifiers. In particular, data processing system 160 does not encode detected RFID event details into the beacon signals. Additionally, in one aspect, customer mobile device 122 passively receives the beacon signal, which allows system 160 to match customers to RFID tags detected in the same area at the same time. Block 302 depicts the physical setup of tracking zones 110. The setup is the same as that described above for FIG. 2 block 202. At block 304, each beacon 120 broadcasts a static signal, such as following the iBeacon™ or other suitable standard, which is unique to the beacon 120 and is registered in data storage 170. Blocks 306, 300, 312, and 313 of FIG.

3 depict steps similar to that described above for respective blocks 206, 200, 212, and 213 of FIG. 2.

Block 314 depicts the transfer of aggregate data available from a mobile device 122 to the data processing system 160, which along with the corresponding mobile account ID is stored as beacon event data 174. Data processing system 160 then uses the location, time stamp, and signal strength from beacon event data 174 to match a mobile device to RFID tags 132 detected in the same location during the same time period according to location, time stamp and signal strength recorded in RFID event data 172. As a result, when paired with the corresponding registered mobile account ID from the customer database 178, the matched data links specific customers to specific RFID event data records 172, and thus links them to interaction with specific products in a specific tracking zone 110 at a specific point in time. Block 316 depicts setup, deployment and tracking of mobile checkout & targeted CRM and/or advertising campaigns that are identical to that described above for FIG. 2 block 216.

Referring now to FIG. 4, there is depicted a high level logical flowchart of an exemplary process for tracking an individual's interaction with RFID tagged items for use in accordance with an alternative embodiment. In this embodiment, beacons 120 include receivers that are operative to receive signals that are transmitted from mobile devices 122. In one aspect, the mobile device 122 broadcasts its identity to a sensor, which allows a computer system to match customers to RFID tags detected in the same area at the same time.

Block 402 depicts the physical setup of tracking zones 110. The setup the same as described above for FIG. 2 block 202, except in this case the beacons 120 are devices that are set up to receive signals from customer mobile devices 122. Block 406 depicts RFID reader systems 130 reading RFID tags 132, as described above for FIG. 2 block 206.

Block 400 depicts the installation and configuration of tracking software on a current or prospective customer's mobile device 122. The software is executed by processor(s) of the mobile device 122 to passively send signals, which are configured for receipt by beacons 120 inside of tracking zones 110, that contain a unique mobile ID, which has been registered in customer database 178. Passive in this context means no active involvement (user inputs, etc.) is required from the customer after the software has been installed and activated. Block 412 depicts the mobile device transmitting these unique mobile ID signals. In one embodiment, beacons 120 repeatedly broadcasts a signal to ping the mobile device 122 which causes the mobile device 122 to broadcast the mobile ID signal. Block 410 depicts a beacon 120 receiving and transferring this unique mobile ID data to data processing systems 160, where it is recorded along with the corresponding beacon location, timestamp and signal strength data as beacon event data 174. Block 408 depicts data processing systems 160 using the location, time stamp and signal strength information recorded in beacon event data 174 to match to RFID tags 132 detected in the place and time according to location, time stamp and signal strength information recorded in RFID event data 172. As a result, when paired with the corresponding registered mobile account ID from the customer database 178, the matched data links specific customers to specific RFID event data records 172, and thus links them to interaction with specific products in a specific tracking zone at a specific point in time. Block 416 depicts setup, deployment and tracking of mobile checkout & targeted CRM and/or advertising campaigns as described above for FIG. 2 block 216.

Figure 6:
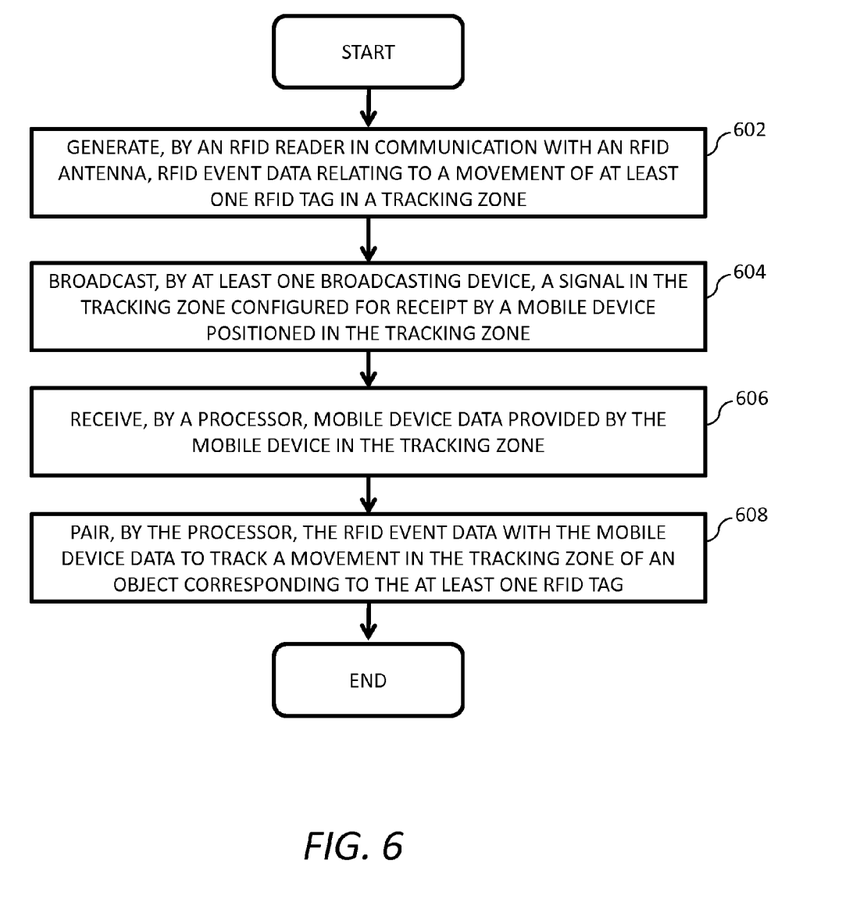
FIG. 6 illustrates is a flow diagram of an exemplary method for tracking the interaction of a customer with an RFID tagged object.

Referring now to FIG. 6, a flow diagram of an exemplary method for tracking an individual's interaction with an RFID tagged object in a retail environment is illustrated in accordance with one or more embodiments. Reference is made to FIG. 1 throughout the following description of FIG. 6. At block 602, RFID reader system 130 generates RFID event data 172 relating to a movement of at least one RFID tag 132 in a tracking zone 110. As one example, an RFID tag 132 may be attached to an article of clothing in a retail store. In this example, as a customer moves the article of clothing into or within the tracking zone 110, the RFID reader system 130 detects the RFID tag, generates the RFID event data 172, and provides the RFID event data 172 to data processing system 160, as described herein.

At block 604, one or more broadcasting devices, such as a beacon 120, broadcasts a signal in the tracking zone 110 configured for receipt by a mobile device 122. In one embodiment, the signal may also include RFID event data 172 encoded into the signal before beacon 120 broadcasts the signal. At block 606, processor 164 receives mobile device data 173 provided by the mobile device 122 in the tracking zone 110. In one embodiment, the mobile device data 173 includes beacon event data 174 that is based on the signal received by the mobile device 122 from the beacon 120. In one embodiment, the mobile device data 173 includes RFID event data 172 extracted from the signal.

At block 608, processor 164 pairs the RFID event data 172 with the mobile device data 173 to track the customer's interaction with the object(s) corresponding to the at least one RFID tag 132. In an exemplary embodiment, the processor 164 compares location and timestamp data from the mobile device data 173 and RFID event data 172 to determine that the owner of the mobile device 122 is considering purchase of the tagged product. Additionally, the tracking system 100 is further configured to track products moving from one tracking zone to another tracking zone using the methods described herein.

Figure 7:
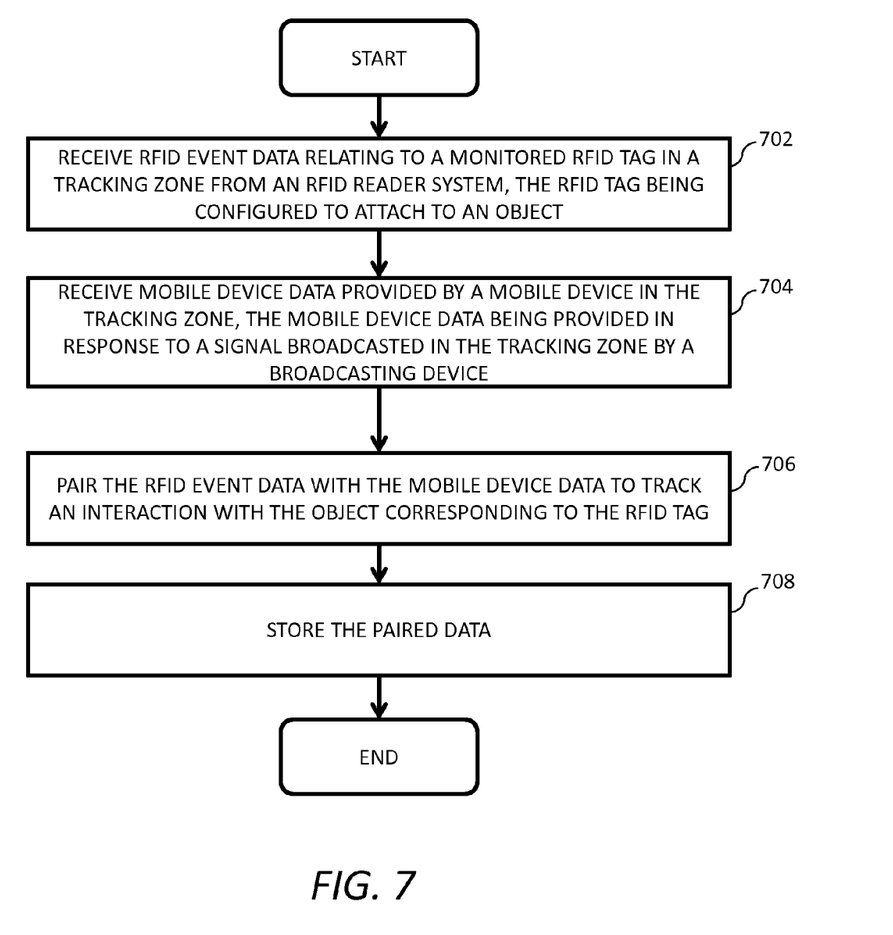
FIG. 7 illustrates a flow diagram of another exemplary method for tracking the interaction of a customer with an RFID tagged object.

Referring now to FIG. 7, a flow diagram of another exemplary method for tracking the interaction of a customer with an RFID tagged object is illustrated. Reference is made to FIG. 1 throughout the following description of FIG. 7. At block 702, processor(s) 164 of data processing system 160 receives RFID event data 172 relating to a monitored RFID tag 132 in a tracking zone 110 from an RFID reader system 130. The RFID tag 132 is configured to attach to an object. At block 704, processor 164 receives mobile device data 173 provided by a mobile device 122 positioned in the tracking zone 110. The mobile device data 173 is provided in response to a signal broadcasted in the tracking zone 110 by a beacon 120, as described herein. In one embodiment, the mobile device data 173 may include beacon event data 174. In one embodiment, the mobile device data 173 may include RFID event data 172. In one embodiment, the received RFID event data 172 is generated by RFID reader system 130 based on a movement of the object within a retail environment. At block 706, processor 164 pairs the RFID event data 172 with the mobile device data 173 to track an interaction with the object corresponding to the RFID tag 132. At block 708, processor 164 stores the paired data in data storage 170.

While the tracking system 100 of the present disclosure has been described in conjunction with an individual's mobile device 122 in particular, the functionality and operation of tracking system 100 may be used in conjunction with other suitable electronic communication devices carried by an individual.

While the present disclosure has been described as having an exemplary design, the embodiments of the present disclosure may be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this disclosure pertains.

What is claimed is:

1. A tracking system including:
a plurality of radio frequency identification (RFID) tags, each RFID tag being configured to attach to an object;
an RFID reader system including at least one RFID reader in communication with at least one RFID antenna, the RFID reader system being operative to detect an RFID tag in a tracking zone, the tracking zone being based on a detection range of the RFID reader system;
at least one broadcasting device operative to broadcast a signal in the tracking zone, wherein the signal is configured to be received by a mobile device positioned in the tracking zone; and
a computer processor operative to:
receive RFID event data relating to the detection of the RFID tag in the tracking zone, the RFID event data being provided by the at least one RFID reader,
receive mobile device data provided by the mobile device based on the signal broadcast by the at least one broadcasting device in the tracking zone, and
pair the RFID event data with the mobile device data to track a movement in the tracking zone of an object corresponding to the detected RFID tag.

2. The system of claim 1, wherein the mobile device data comprises mobile device identification data, an identification of the tracking zone, and timestamp data, and wherein the RFID event data comprises RFID tag identification data, an identification of the tracking zone, and timestamp data.

3. The system of claim 1, wherein the processor is operative to encode the received RFID event data into the signal before the at least one broadcasting device broadcasts the signal, wherein the mobile device data includes the RFID event data extracted from the broadcasted signal.

4. The system of claim 1, wherein the signal broadcasted by the at least one broadcasting device includes location data configured for receipt by the mobile device that identifies the tracking zone, the mobile device data includes the location data extracted from the signal, and the processor pairs the RFID event data with the location data of the mobile device data to track the object.

5. The system of claim 1, wherein the mobile device data includes mobile device identification information, the mobile device data is received by the at least one broadcasting device and routed by the at least one broadcasting device to the processor, and the processor pairs the RFID event data with the mobile device data by matching the mobile device identification information to the received RFID event data.

6. The system of claim 1, wherein the signal broadcast by the at least one broadcasting device is a beacon signal conforming to a Bluetooth communication protocol.

7. The system of claim 1, wherein the plurality of RFID tags are attached to a plurality of retail products in a retail environment.

8. A tracking method including:
generating, by an RFID reader in communication with an RFID antenna, RFID event data relating to a movement of at least one RFID tag in a tracking zone;
broadcasting, by at least one broadcasting device, a signal in the tracking zone configured for receipt by a mobile device positioned in the tracking zone;
receiving, by a processor in communication with the RFID reader and the at least one broadcasting device, mobile device data provided by the mobile device in the tracking zone, the mobile device data being based on the signal broadcast by the at least one broadcasting device; and
pairing, by the processor, the RFID event data with the mobile device data to track a movement in the tracking zone of an object corresponding to the at least one RFID tag.

9. The method of claim 8, wherein the mobile device data comprises mobile device identification data, an identification of the tracking zone, and timestamp data, and wherein the RFID event data comprises RFID tag identification data, an identification of the tracking zone, and timestamp data.

10. The method of claim 8, further including encoding, by the processor, the received RFID event data into the signal before the at least one broadcasting device broadcasts the signal, wherein the mobile device data includes the RFID event data extracted from the signal.

11. The method of claim 8, wherein the signal broadcasted by the at least one broadcasting device includes location data configured for receipt by the mobile device that identifies the tracking zone, the mobile device data includes the location data extracted from the signal, and the pairing includes pairing the RFID event data with the location data of the mobile device data to track the object.

12. The method of claim 8, wherein the mobile device data includes mobile device identification information, the mobile device data is received by the at least one broadcasting device and routed by the at least one broadcasting device to the processor, and the pairing includes matching the mobile device identification information to the received RFID event data.

13. The method of claim 8, further including configuring the mobile device to detect the signal from the at least one broadcasting device and to transmit data in response to the signal, wherein the configuring the mobile device includes installing a software application on the mobile device.

14. The method of claim 8, wherein the signal includes a beacon signal broadcasted via a Bluetooth communication protocol.

15. A method carried out by at least one processor, the method including:
receiving RFID event data relating to a monitored RFID tag in a tracking zone from an RFID reader system, the RFID tag being configured to attach to an object;
receiving mobile device data provided by a mobile device positioned in the tracking zone, the mobile device data being provided in response to a signal broadcasted in the tracking zone by a broadcasting device;
pairing the RFID event data with the mobile device data to track an interaction with the object corresponding to the RFID tag; and
storing the paired data.

16. The method of claim 15, wherein the received RFID event data is generated by the RFID reader system based on a detected movement of the object within a retail environment.

17. The method of claim 15, wherein the mobile device data includes at least one of user identification data, location data, and timestamp data.

18. The method of claim 15, further including encoding the received RFID event data into the signal before the signal is broadcasted by the at least one broadcasting device, wherein the mobile device data includes the RFID event data extracted from the signal.

19. The method of claim 15, wherein the signal broadcasted by the at least one broadcasting device includes location data configured for receipt by the mobile device that identifies the tracking zone, the mobile device data includes the location data extracted from the signal, and the pairing includes pairing the RFID event data with the location data of the mobile device data to track the interaction with the object.

20. The method of claim 15, wherein the mobile device data includes mobile device identification information, the mobile device data is received by the at least one broadcasting device and routed by the at least one broadcasting device to the processor, and the processor pairs the RFID event data with the mobile device data by matching the mobile device identification information to the received RFID event data.

\* \* \* \* \*